Jan. 28, 1936.  J. V. PERNICE  2,028,991

VEHICLE SPRING SUSPENSION

Filed March 5, 1935    2 Sheets-Sheet 1

Inventor

James V. Pernice

By C. Uge Fraser

Attorney

Jan. 28, 1936.    J. V. PERNICE    2,028,991
VEHICLE SPRING SUSPENSION
Filed March 5, 1935    2 Sheets-Sheet 2
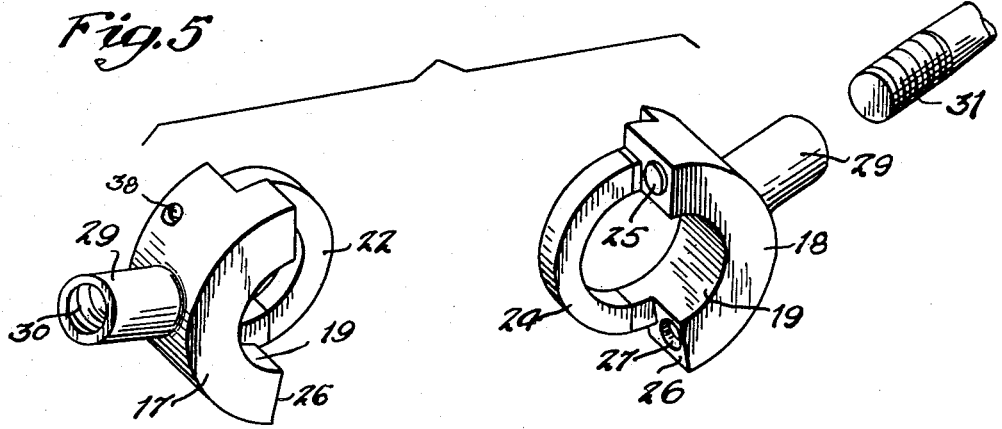
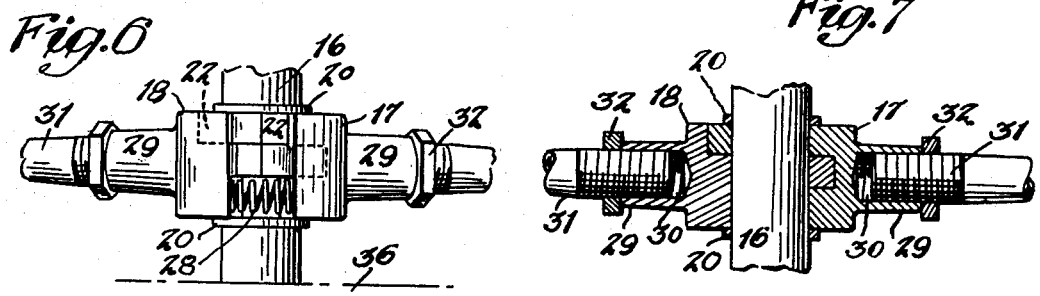
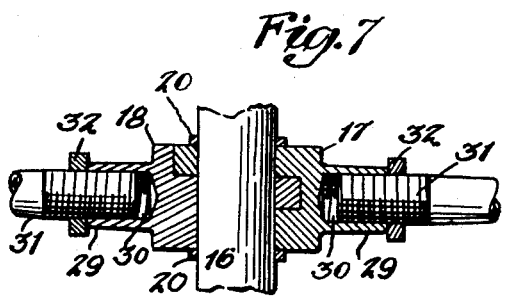
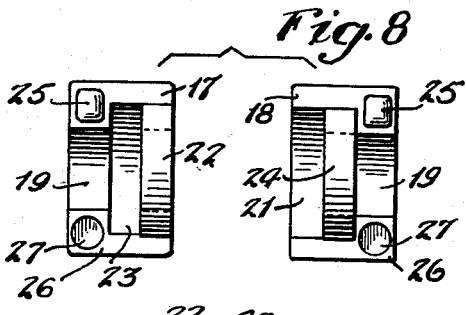
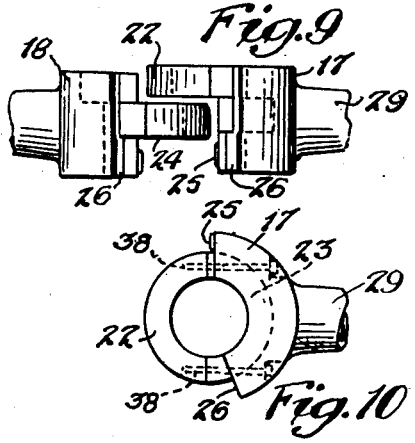
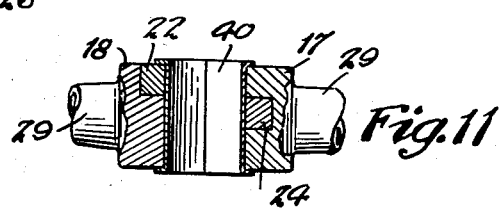
Inventor
James V. Pernice
By C. H. Fraser
Attorney Patented Jan. 28, 1936

2,028,991

UNITED STATES PATENT OFFICE 2,028,991

VEHICLE SPRING SUSPENSION

James V. Pernice, Mount Morris, N. Y.

Application March 5, 1935, Serial No. 9,471

19 Claims. (Cl. 267—20)

My invention relates to improvements in vehicle spring suspensions and more particularly to spring devices for supporting the frames of vehicles on their axles.

Considerable difficulty has heretofore been encountered in the springing of vehicle frames due to the variation in tension between the front and rear springs, particularly in automobiles. In order to properly support the front axle of automobiles it has been customary to use a front spring which is much stiffer than the rear spring, which resulted in a tendency of the car to buck and otherwise ride unevenly.

Another difficulty heretofore experienced is the side sway attendant with the use of the usual leaf springs suspended from shackles connected to the vehicle frame.

An important object of my invention is to obviate these difficulties by providing a vehicle spring device which will produce easy and even riding qualities while firmly supporting and bracing the vehicle axles.

Another object of my invention is the provision of a spring device having a large and strong bearing support for the vehicle axles.

Still another object of my invention is to provide a device of this character which will give readily during the initial upward movement of the vehicle axle, and which will provide progressively increasing resistance against further movement of the axle.

Yet another object of my invention is to provide a device of the above mentioned character which is adjustable to fit different vehicles and which may be substituted for the leaf springs of vehicles now in use with very few changes in the vehicle.

A still further object of my invention is the provision of a device of this character which is strong and durable and which is inexpensive to manufacture and install.

Other objects of my invention will be apparent during the course of the following description.

Figure 1:
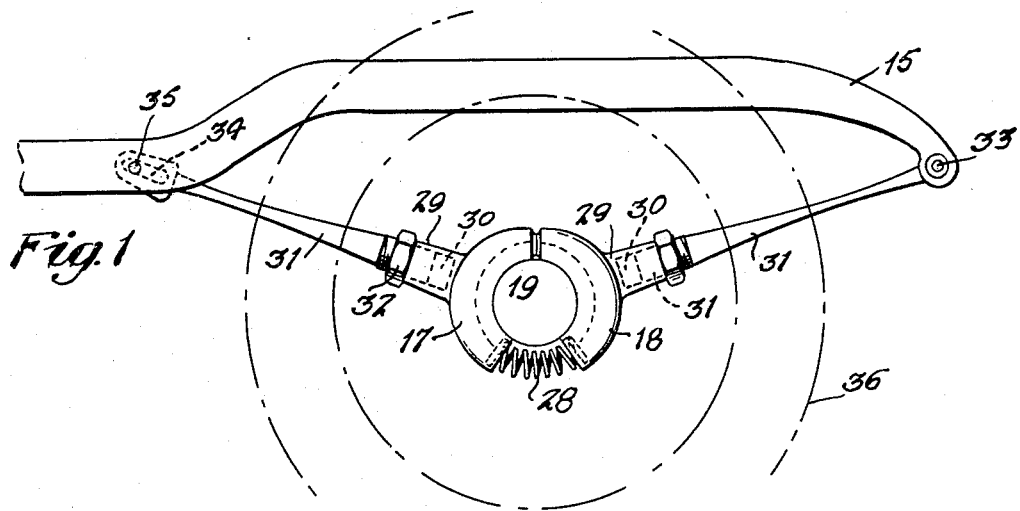
Figure 2:
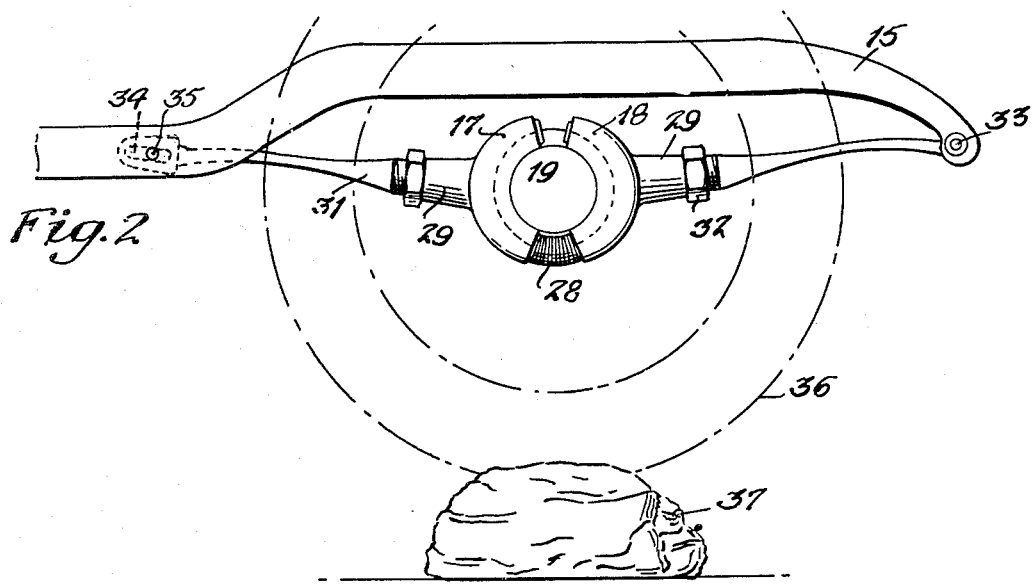
Figure 3:
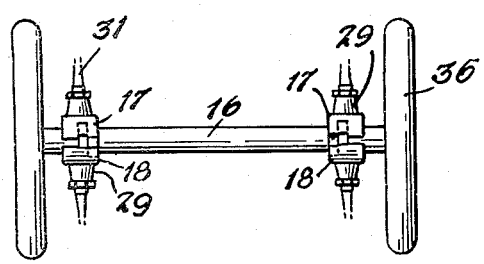
Figure 4:
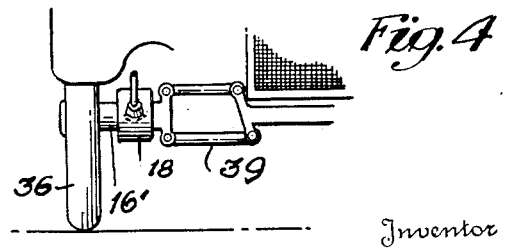

In the drawings, which form a part of this specification and wherein like characters of reference denote like parts throughout the same, Figure 1 is a side elevation of a portion of a vehicle frame having my invention applied thereto, Figure 2 is a similar view showing the device in operation, Figure 3 is a top plan view of a vehicle axle showing the position of my improved spring bearings thereon, Figure 4 is a fragmentary front elevation of a vehicle showing my improved spring device in use with independent wheel axles, Figure 5 is a perspective view showing the spring hub sections before assembly, Figure 6 is a bottom plan view of one of the spring hubs in position on a vehicle axle, Figure 7 is a horizontal sectional view thereof, Figure 8 is an elevation of the meeting faces of the complementary hub sections, Figure 9 is a bottom plan view showing the hub sections separated, Figure 10 is a side elevation of one of the hub sections, Figure 11 is a horizontal section of one of the spring hubs with a bearing sleeve arranged therein, and, Figure 12 is a transverse section of a bearing sleeve for use with an I-beam axle.

In the drawings, wherein for the purpose of illustration is shown a preferred embodiment of my invention, the numeral 15 designates the frame of a vehicle such as an automobile, the frame being offset above the axle 16 in the usual manner.

A pair of complementary hub sections 17 and 18 have a bore 19 for reception of the axle 16 and suitable collars or the like 20 may be secured to the axle to prevent movement of the hub sections axially of the axle 16. The hub sections 17 and 18 are substantially semi-circular and are adapted to be interlocked about the axle 16. Half of the axle bore 19 is arranged in each hub section.

A semi-circular groove 21 is arranged in the bore 19 of hub section 18 immediately adjacent the inner edge thereof and rotatably receives a ring 22 projecting from the hub section 17 immediately adjacent the inner edge thereof. A similar groove 23 is arranged in the hub section 17 immediately adjacent the ring 22 and rotatably receives a ring 24 projecting from the hub section 18 which is arranged immediately adjacent groove 21. Axle bore 19 extends through both rings 22 and 24.

When assembled, ring 22 of hub section 17 enters groove 21 of section 18 while ring 24 of section 18 enters groove 23 of section 17. The rings 22 and 24 fit closely in the grooves, and the sections are interlocked by the axle which passes through bore 19 formed by the two complementary sections, as seen in Figures 1 and 2.

The abutting upper portions of the hub sections are provided with suitable buffers such as rubber pads 25 of any suitable shape which contact in the normal position of the parts. The lower opposite faces 26 of the hub sections are spaced from a vertical line through the center of the sections, and in the normal position of the parts, there is a substantial space between these faces, as seen in Figures 1, 2 and 6. Suitable openings 27 are provided in faces 26 to receive the ends of a suitable resilient member such as a coil spring 28 which is secured in these openings.

The coil spring normally forces the faces 26 apart as seen in Figure 1, while relative rotative movement of the hub sections is possible, against the tension of the spring 28, which will return the sections to their normal position. It will be seen that in the assembled position, the interlocked hub sections form a bearing or housing of substantial width and strength for the vehicle axle, and that this bearing or housing is not altered by relative rotative movement of the hub sections.

Bosses 29 having substantial length are formed integrally with each hub section and extend upwardly therefrom at an angle of about 20° to a horizontal plane. This angle can be changed to suit varying conditions. The bosses 29 are provided with longitudinal screw threaded openings or bores 30 for the reception of the cylindrical screw-threaded ends of arms 31. The arms 31 are adjustably received in openings 30 and suitable nuts 32 are provided to secure the arms in adjusted position. The end of one of the arms 31 is pivotally secured to the end of the vehicle frame, as by a bolt 33, while the end of the other arm is enlarged and has a longitudinal slot 34 therein to slidably and pivotally receive a pin 35 in the vehicle frame, as indicated in Figures 1 and 2.

While the arms 31 may be rigid, and the coil spring 28 relied on for cushioning of shocks, I prefer to form the arms of spring metal. When made of spring material the arms 31 are tapered to a point adjacent their ends, so that they will flex under pressure.

When the vehicle wheel indicated at 36 meets an obstruction or bump such as indicated at 37 the wheel and axle rises towards frame 15. As the ends of arms 31 are secured at 33 and 35, the hub sections will partake of relative rotation about the axis of axle 16 against the tension of coil spring 28 which will resist upward movement of the axle and hub sections 17 and 18. As the axle rises higher, the spring arms 31 will also be flexed and will resist upward movement of the axle. The relative position of the parts under these circumstances is illustrated in Figure 2. When the obstruction has been passed, the spring arms will return to their normal straightened position and the coil spring 28 will then return the hub sections to their normal position. The coil springs 28 present a progressively increasing resistance to upward movement of the axle, while the tension of the spring arms 31 is added to that of coil springs 28 as the axle continues to rise.

For convenience in assembling the parts, the rings 22 and 24 are divided and secured together by bolts 38 suitably countersunk so as not to interfere with the bearing surfaces of the rings and grooves.

My improved spring construction is preferably used throughout an automobile chassis construction. However, it may be used only at the front of a vehicle, if this is desired, with the usual leaf spring construction at the rear. It may also be used to advantage with independent axles 16' secured in any suitable manner to the frame, as at 39 in Figure 4.

Where the portion of the axle or axle housing to be received in bore 19 is cylindrical and smooth, the hub sections 17 and 18 may directly engage the same. However, it is preferred to employ a split bearing sleeve 40, as indicated in Figure 11, in the bore 19 to receive the axle. Where the axle or axle housing is not cylindrical or smooth, the sleeve 40' may be formed with an opening to fit the axle or axle housing 16, and yet present a cylindrical bearing surface to the bore 19, as illustrated in Figure 12. The bearing sleeve 40 is intended to be used in the construction shown in Figures 1 to 10 but is omitted from these figures in order to expose to view the construction of the hub sections.

In replacing the usual leaf spring construction it is only necessary to provide bolts for the ends of arms 31. In many cases the usual shackle bolts on the frame may be used for bolts 33 and 35, and the adjustment of the arms 31 in bosses 29 will permit of the proper adjustment of the parts. The particular pin and slot construction shown at 34 and 35 is illustrative only, and may be replaced by any suitable sliding connection, if desired. By making the arms 31 sufficiently flexible the pivotal and sliding connections may be dispensed with, although their use is preferred. When the arms are rigidly secured to the frame, the spring arms 31 will resist rotation of the hub members, and coil spring 28 can be dispensed with. However, for best results, both resilient arms and coil spring 28 are required.

An important feature of my invention is the bearing formed by the complementary interlocking hub sections 17 and 18. The interfitting rings and grooves act as bearings in the relative rotation of the parts, and even while rotating, the hub sections have the effect of an integral and substantial bearing or housing for the axle, as will be apparent from an inspection of Figures 7 and 11. No twisting or wrenching of the parts is possible, due to the peripheral and side bearing surfaces of the rings in the grooves, and road shocks are evenly distributed over a relatively large portion of the axle. A spring device constructed in accordance with my invention is considerably stronger than the usual leaf spring construction and will have smoother riding qualities, with substantially no side sway. Twisting and wrenching of the axles will be prevented by the large and substantial bearing surface of the bore 19 of the wide interlocking hub sections. The hub sections may be encased in any suitable manner, without interfering with their operation.

While I have shown and described the preferred embodiment of my invention it is to be understood that various changes in the size, shape and arrangement of parts may be resorted to without departing from the spirit of my invention or the scope of the subjoined claims.

Having thus described my invention, what I desire to claim and protect by Letters Patent is:

1. A spring device to connect the wheel carrying axle and frame of a vehicle comprising a pair of complementary interlocking hub members having a bore extending therethrough in the assembled position of the hub members, said hub members being relatively rotatable about the axle, resilient means arranged to resist relative rotation of the hub members, and an arm connecting each hub member to the vehicle frame.

2. A spring device to connect the wheel carrying axle and frame of a vehicle comprising a pair of complementary interlocking hub members having a bore extending therethrough in their assembled position, said hub members being relatively rotatable about the axle, resilient means arranged to resist relative rotation of the hub members, and a resilient arm connecting each hub member to the vehicle frame.

3. A spring device to connect the axle and frame of a vehicle comprising a pair of complementary interlocking hub members having a bore extending therethrough in their assembled position, said hub members being relatively rotatable about the axle, and a resilient arm connecting each hub member to the vehicle frame.

4. A spring device connecting the axle and frame of a vehicle, comprising a pair of relatively rotatable members, there being a bore extending through said members and adapted to receive the vehicle axle, said bore being arranged partially in each member, resilient means to resist relative rotation of said members, and an arm connecting each of said members to the vehicle frame, one of said arms being longitudinally adjustable.

5. A spring device to connect the axle and frame of a vehicle comprising a pair of relatively rotatable members, there being a bore extending through said members and adapted to receive the vehicle axle, said bore being arranged partially in each member, resilient means to resist relative rotation of said members, and an arm of resilient material connecting each of said members to the vehicle frame, one of said arms being longitudinally adjustable.

6. A spring device to connect the axle and frame of a vehicle comprising a pair of complementary interlocking hub members having a bore extending therethrough in the assembled position of the hub members, said hub members being relatively rotatable about the axle, resilient means arranged to resist relative rotation of the hub members, and an arm connecting each hub member to the vehicle frame, said arms each having a longitudinally adjustable connection with said hub members.

7. A spring device to connect the axle and frame of a vehicle comprising a pair of complementary interlocking hub members having a bore extending therethrough in their assembled position, said hub members being relatively rotatable about the axle, resilient means arranged to resist relative rotation of the hub members, and a resilient arm connecting each hub member to the vehicle frame, said resilient arms being longitudinally adjustable.

8. A spring device to connect the axle and frame of a vehicle comprising a pair of complementary relatively rotatable hub sections having a bore extending therethrough in the assembled position of the sections to receive the vehicle axle, a ring carried by the meeting face of each section, there being a bearing groove in the bore of each hub section to rotatably receive the ring of the other section, resilient means to resist relative rotation of the hub sections, and arms pivotally connecting the hub sections to the vehicle frame.

9. A spring device to connect the axle and frame of a vehicle comprising a pair of complementary relatively rotatable hub sections having a bore extending therethrough in the assembled position of the sections to receive the axle, a ring carried by one of said sections, there being a bearing groove in the other of said sections to rotatably receive the ring, resilient means to resist relative rotation of the hub sections, and arms connecting the hub sections to the vehicle frame.

10. A spring device for a vehicle having a frame and an axle, comprising a pair of complementary relatively rotatable hub sections having a bore extending therethrough in the assembled position of the sections, said axle extending through the bore of the hub sections and serving to interlock the sections against relative axial and radial movement, resilient means to resist relative rotation of the hub sections, and resilient arms connecting the hub sections to the vehicle frame.

11. A spring device for a vehicle having a frame and an axle, comprising a pair of relatively rotatable hub sections having a bore extending therethrough in their assembled position, said bore being arranged partially in each section, rings carried by the sections, there being bearing grooves arranged in the bore of each section to rotatably receive the ring of the other section, said axle extending through the bore of the sections and through the rings to interlock the sections, means to resiliently resist relative rotation of the sections, and arms connecting the sections to the frame of the vehicle.

12. A spring device to connect the axle and frame of a vehicle comprising a pair of relatively rotatable hub sections having a bore extending therethrough in the assembled position of the sections to receive the vehicle axle, a ring detachably secured to the meeting face of each section, there being a bearing groove in the bore of each hub section to rotatably receive the ring of the other section, resilient means resisting relative rotation of the hub sections, and arms connecting the hub sections to the vehicle frame.

13. A spring device for a vehicle having a frame and an axle, comprising a pair of complementary relatively rotatable hub sections having a bore extending therethrough in the assembled position of the sections, said axle extending through the bore of the sections to interlock the sections against relative axial and radial movement, resilient means to resist relative rotation of the hub sections, bosses mounted on said sections, and arms pivotally connected at one end to the vehicle frame and having their other ends adjustably secured in the bosses.

14. A spring device for a vehicle having a frame and an axle, comprising a pair of relatively rotatable hub sections having a bore extending therethrough in the assembled position of the sections, said bore being arranged partially in each section, rings carried by each section and fitting in bearing grooves in the bore of the other section, said axle extending through the bore and rings of the sections to interlock the sections, means to resiliently resist relative rotation of the sections, bosses carried by the sections, and resilient arms connected at one end to the frame and having their other ends adjustably secured in the bosses.

15. A spring device for a vehicle having a frame and an axle, comprising a pair of hub sections, rings carried by said sections, the axle extending through the rings to interlock the sections while permitting relative rotation thereof, resilient means resisting relative rotation of the sections, and arms connecting the sections to the frame.

16. A spring device for a vehicle having a frame and an axle, comprising a pair of hub sections, rings carried by the sections, the axle extending through the rings to interlock the sections while permitting relative rotation of the sections, resilient means resisting relative rotation of the sections, and resilient arms connecting the sections to the vehicle frame.

17. A spring device for a vehicle having a frame and an axle, comprising a pair of complementary interfitting relatively rotatable hub sections having a bore extending therethrough in the assembled position of the sections, said axle extending through the bore of the hub sections to interlock said sections, resilient means to resist relative rotation of said hub sections, and arms connecting the hub sections to the frame.

18. A spring device for a vehicle having a frame and an axle, comprising a pair of complementary relatively rotatable hub sections, said sections having interfitting portions, there being a bore extending through the hub sections in their assembled position, said axle extending through the bore of the hub sections to interlock said sections against relative axial and radial movement, resilient means to resist relative rotation of the hub sections, and means connecting the hub sections to the frame.

19. A spring device for a vehicle having a frame and an axle, comprising a pair of complementary relatively rotatable hub sections, said sections having interfitting portions, there being a bore extending through the interfitting portions of the sections in their assembled position, said axle extending through the bore of the hub sections to interlock said sections against relative axial and radial movement, resilient means to resist relative rotation of the hub sections, and means connecting the hub sections to the frame.

JAMES V. PERNICE.